US012691646B2

(12) United States Patent
Coudurier

(10) Patent No.: US 12,691,646 B2
(45) Date of Patent: Jul. 28, 2026

(54) FIBER APPLICATION HEAD WITH RETRACTABLE FLAP

(71) Applicant: CORIOLIS GROUP, Queven (FR)

(72) Inventor: Julien Coudurier, Lorient (FR)

(73) Assignee: CORIOLIS GROUP, Queven (FR)

( * ) Notice: Subject to any disclaimer, the term of this patent is extended or adjusted under 35 U.S.C. 154(b) by 608 days.

(21) Appl. No.: 17/787,572

(22) PCT Filed: Dec. 15, 2020

(86) PCT No.: PCT/FR2020/000275
§ 371 (c)(1),
(2) Date: Oct. 24, 2022

(87) PCT Pub. No.: WO2021/123517
PCT Pub. Date: Jun. 24, 2021

(65) Prior Publication Data
US 2023/0294372 A1 Sep. 21, 2023

(30) Foreign Application Priority Data
Dec. 19, 2019 (FR) ........................................ 1914574

(51) Int. Cl.
*B29C 70/38* (2006.01)
*B29C 35/08* (2006.01)

(52) U.S. Cl.
CPC ........ *B29C 70/384* (2013.01); *B29C 35/0805* (2013.01)

(58) Field of Classification Search
CPC .................................................... B29C 70/384
See application file for complete search history.

(56) References Cited

U.S. PATENT DOCUMENTS

| | | | |
|---|---|---|---|
| 7,926,537 B2 | 4/2011 | Hamlyn et al. | |
| 2008/0302483 A1 | 12/2008 | Vaniglia | |
| 2016/0114540 A1* | 4/2016 | Hamlyn | B29C 70/384 |
| | | | 156/166 |

FOREIGN PATENT DOCUMENTS

| | | |
|---|---|---|
| EP | 2 134 532 B1 | 12/2015 |
| FR | 2949378 | 3/2011 |

(Continued)

OTHER PUBLICATIONS

Search Report corresponding to PCT/FR2020/00275 dated Apr. 8, 2021.
Written Opinion corresponding to PCT/FR2020/000275 dated.

*Primary Examiner* — Susan D Leong
*Assistant Examiner* — Timothy G Hemingway
(74) *Attorney, Agent, or Firm* — CUSHMAN PARTNERS, LLC

(57) ABSTRACT

A fiber application head for the production of composite material parts. The fiber application head includes a compaction roller, guiding means, a retractable flap which can be displaced between an active position in which the said flap is able to come by its distal end against the fiber in order to bring the fiber in abutment against the roller, and a retracted position in which the flap is spaced apart from the roller, and a heating system able to emit thermal radiation towards the nip zone between the roller and the application surface. The flap is displaceable by actuation means between its active position and its retracted position so that the roller is subjected to the radiation of the heating system over a greater surface area in the retracted position than in the active position of the flap.

19 Claims, 2 Drawing Sheets

(56)  References Cited

FOREIGN PATENT DOCUMENTS

| | | | | |
|---|---|---|---|---|
| FR | 2949378 A1 * | 3/2011 | ........... | B29C 70/388 |
| FR | 3 074 082 A1 | 5/2019 | | |
| FR | 3 074 084 A1 | 5/2019 | | |
| GB | 2492594 A * | 1/2013 | ........... | B29C 70/384 |
| WO | WO-2013030467 A1 * | 3/2013 | ........... | B29C 70/388 |
| WO | WO2013072583 | 5/2013 | | |
| WO | WO 2014/029969 A1 | 2/2014 | | |
| WO | WO-2017072421 A1 * | 5/2017 | ............. | B26D 1/025 |
| WO | WO 2017/134453 A1 | 8/2017 | | |

* cited by examiner

FIBER APPLICATION HEAD WITH RETRACTABLE FLAP

CROSS-REFERENCE TO RELATED APPLICATIONS

The present application is a National Phase entry of PCT Application No. PCT/FR/2020/000275 filed Dec. 15, 2020, which claims priority from FR Patent Application No. 1914574, filed Dec. 19, 2019, which applications are incorporated herein by reference.

TECHNICAL FIELD

The present invention relates to a fiber application head for the production of composite material parts, more particularly a fiber application head with a retractable flap, as well as to a method for manufacturing a composite material part by means of such an application head.

BACKGROUND

Fiber application machines are known for the application by contact on a lay-up tool of one or more continuous flat fibers, of the ribbon type, dry or impregnated with thermosetting or thermoplastic resin, in particular carbon fibers, consisting of a multitude of carbon threads or filaments. After application of several superimposed layers of fibers, the resulting part is subjected to a curing operation, called polymerization, in the case of thermosetting resins, and called consolidation in the case of thermoplastic resins.

These fiber application machines, also called fiber placement machines, typically comprise an application head, a displacement system able to displace the application head, and storage means for storing the fibers. The fiber storage means can be mounted on the head, or can be located remotely from the head. The head typically comprises a compaction system comprising at least one compaction roller for applying one or more fibers to an application surface of a lay-up tool, guiding means for guiding the fiber or fibers in the form of a band towards the compaction roller, and for each fiber, cutting means for cutting a fiber, rerouting means for rerouting the fiber to the compaction roller after a cut made by the cutting means, and clamping means for clamping the fiber just cut. The compaction system further comprises at least one compaction cylinder for applying the fibers with a compaction force.

In order to ensure a good guiding of the fiber(s) exiting from the guiding means to the compaction roller, especially after a fiber cutting operation and/or an operation of rerouting of the fiber, it has been proposed in the patent document WO2013/030467 a head equipped with a comb comprising a plurality of flexible tabs or slats able to come against the fiber(s) exiting from the guiding means to bring the fiber(s) in abutment against the compaction roller. In the case of a band made up of several fibers, such a flexible tab ensures that the fibers are well maintained in relation to one another, substantially edge to edge, and avoids lateral deviation of the fibers particularly during curved trajectories of the head on the mold.

It has also been proposed in the patent document FR2949378 a head for lay-up of a fiber or band equipped with a retractable comb or flap with flexible slats that can be moved between an active position in which the flap is able to come by its distal portion against the band exiting from the guiding means in order to put the band in abutment against the compaction roller, and a retracted position in which the flap is spaced apart from the compaction roller. The displacement of the flap between its two positions is achieved by a rotational movement, the clearance angle defined between the application surface and the flap being larger in the active position than in the retracted position.

Similarly, US2008/0302483 describes a fiber application head for the application of a band of multiple fibers, with a retractable finger or flap provided for each fiber, each finger also being movable by a rotational motion between an active position and a retracted position in which the finger is closer to the lay-up surface.

Moreover, depending on the type of fibers deposited, especially in the case of dry fibers provided with a thermoplastic binder or fibers pre-impregnated with a thermoplastic resin, it is necessary to equip the head with a heating system able to emit thermal radiation towards the nip zone between the compaction roller and the application surface. To ensure a good bond between the fiber and the substrate, the heating system should preferably heat each fiber before it is compacted by the latter, as well as the application surface and/or one or more previously applied fibers. The flaps fitted to the heads for guiding the fiber(s) closer to the roller do not allow for optimal heating of the fibers prior to their compaction by the roller.

SUMMARY OF THE INVENTION

The purpose of the present invention is to provide a fiber application head that both guides the fibers well on the roller while ensuring efficient heating for fiber lay-up.

To this end, embodiments of the present invention have for an object a fiber application head for the production of composite material parts comprising a compaction system comprising at least one compaction roller for the application of at least one fiber on the application surface of a mold, guiding means for guiding at least one fiber towards the compaction roller and a retractable flap displaceable by actuation means between an active position in which the retractable flap is able to come by its distal end against the fiber exiting from the guiding means in order to bring the fiber in abutment against the compaction roller, and a retracted position in which the retractable flap is spaced apart from the compaction roller, characterized in that it comprises a heating system able to emit thermal radiation towards the nip zone between the compaction roller and the application surface, in order to heat the fiber exiting from the guiding means before it is compacted by the roller, as well as the application surface and/or one or more previously applied fibers, the retractable flap being displaceable by actuation means between its active position and its retracted position so that the compaction roller is subjected to the radiation of the heating system over a greater surface area in the retracted position than in the active position of the retractable flap.

According to embodiments of the invention, the flap in its retracted position allows the radiation of the heating system to be transmitted to a greater extent than in its active position. The cylindrical surface of the roller is exposed to the radiation emitted by the heating system over an angle that is greater when the flap is in its retracted position than when the flap is in its active position. Thus, the fiber exiting from the guiding means is exposed to the radiation of the heating system before being compacted by the compaction roller over a fiber length that is greater when the flap is in the retracted position than when the flap is in the active position. Advantageously, the flap is displaced into its active position to guide the fiber as close as possible to the roller during the fiber rerouting and/or during a fiber cutting operation. The flap according to an embodiment of the invention can thus be used in its active position for better guidance of the fiber towards the roller when the guidance of the fiber is most critical, for example at the beginning or end of a fiber lay-up, or during trajectories with a significant curvature. During lay-up, when the fiber is compacted by the roller, the fiber guidance is less critical, and the flap in retracted position allows an efficient heating of the fiber exiting from the guiding means and thus allows to obtain a good bonding of the fiber, in particular at high lay-up speeds.

According to an embodiment, the retractable flap is displaceable by a translational movement between its active position and its retracted position, the actuation means preferably comprising at least one cylinder, the flap being, for example, connected by its proximal part to the end of the cylinder rod.

According to one embodiment, the retractable flap in its active position is elastically in abutment by its distal end against the compaction roller, with or without a fiber interposed between the roller and the distal end.

According to one embodiment, the head is provided for application by contact onto a tooling of a single flat fiber, for example in the form of a wide ribbon, for example more than two inches wide. In this case, the head comprises guiding means able to guide a single flat fiber towards the roller, and one or more retractable flaps associated with the compaction roller, for example a single retractable flap displaced between its two positions by one or two cylinders.

According to another embodiment, the head is a so-called fiber placement head for application by contact onto a tooling of a plurality of continuous flat fibers, in the form of a band, each fiber having, for example, a width of ⅛, ¼, ½, 1, 1.5 or 2 inches. In this case, the guiding means are able to guide a plurality of fibers onto a compaction roller in the form of a band, preferably in which the fibers are arranged substantially edge to edge. The head then comprises one or more retractable flaps associated with the compaction roller, for example a single retractable flap for all the fibers, the flap being displaced between its two positions by one or two cylinders. The head advantageously comprises cutting means for cutting, preferably individually, each fiber upstream of the roller in relation to the travel direction of the fibers, and rerouting means, arranged upstream of the cutting means, for rerouting each fiber that has just been cut in order to be able to stop and resume the application of a fiber at any time, as well as to choose the width of the band.

Advantageously, the head also comprises clamping means, arranged upstream of the cutting means, able to clamp, preferably individually, each fiber just cut. According to an embodiment, for the production of composite material parts by application of continuous fibers, preferably arranged edge to edge in the form of a band, the head is able to apply several fibers by means of a compaction system comprising several compaction rollers and compaction cylinders, for each fiber, the head comprises a functional module comprising cutting means and rerouting means, each functional module is mounted so as to be mobile in translation in a compaction direction on a support element of the head, each compaction roller is mounted on one or more adjacent functional modules and a compaction cylinder is associated with the functional module(s) associated with a compaction roller for the translational displacement of the functional module(s), the head comprising an independent heating system associated with each compaction roller, the heating system being able to be displaced with the functional module (s) associated with the compaction roller, and at least one retractable flap associated with at least one compaction roller, one flap is for example associated with each compaction roller.

According to an embodiment, the head comprises one compaction roller per functional module.

According to an embodiment, the compaction rollers are arranged in a single row, side by side without any contact between them, the rotation axis of the compaction rollers being arranged according to a same compaction plane, parallel to the compaction direction.

According to one embodiment, each first functional module comprises guiding means able to guide a first fiber towards the compaction roller along a first guiding plane forming a first non-zero angle with the compaction plane of the rotation axis of the compaction rollers, each second functional module comprises guiding means able to guide a second fiber towards the compaction roller along a second guiding plane forming a second non-zero angle with the compaction plane, the second angle being greater than the first angle, the guiding planes being arranged on the same side of the compaction plane, upstream of the compaction plane with respect to the advance direction of the head.

According to an embodiment, the head comprises a retractable flap associated with each first functional module. According to another embodiment, the head comprises a retractable flap associated with each functional module.

According to an embodiment, each heating system comprises a laser type heating system, or a flash lamp type heating system.

To ensure substantially uniform compaction across the width of the band, each compaction roller is advantageously able to conform to the application surface, in particular to convex and/or concave application surfaces. According to an embodiment, the head comprises one or more flexible rollers, each made of a flexible, elastically deformable material, for example an elastomeric material, so as to be able to deform by conforming to the profile of the surfaces. According to another embodiment, each roller is a segmented rigid roller, for example metallic, comprising a plurality of independent roller segments mounted side by side on a same axial rod, each segment being displaceable on the axial rod, perpendicularly thereto, in an independent manner, and being elastically biased against the application surface by elastic means, such as expandable pocket systems.

The present invention also relates to a method for manufacturing a composite material part comprising the application of continuous fibers onto an application surface, characterized in that the application of fibres is carried out by means of a fiber application head as described above, by relative displacement of the application head with respect to the lay-up surface according to deposition trajectories, the retractable flap associated with a fiber being moved into the active position at least during a fiber rerouting operation and/or fiber cutting operation, preferably at least during a fiber rerouting operation, and returned to the retracted position when the end of the rerouted fiber is no longer compacted by the compaction roller, so as to obtain heating of the fiber before it is compacted by the compaction roller over a greater fibre length.

The flap can also be displaced from time to time in active position on trajectory sections having a significant curvature to avoid a lateral displacement of fibers which could lead to overlapping or gaps between two adjacent fibers and thus avoid an alteration of the mechanical properties of the final part.

The invention will be better understood, and other purposes, details, features and advantages will become clearer in the course of the following detailed explanatory description of a presently preferred particular embodiment of the invention, with reference to the appended schematic drawings.

DETAILED DESCRIPTION

Figure 1:
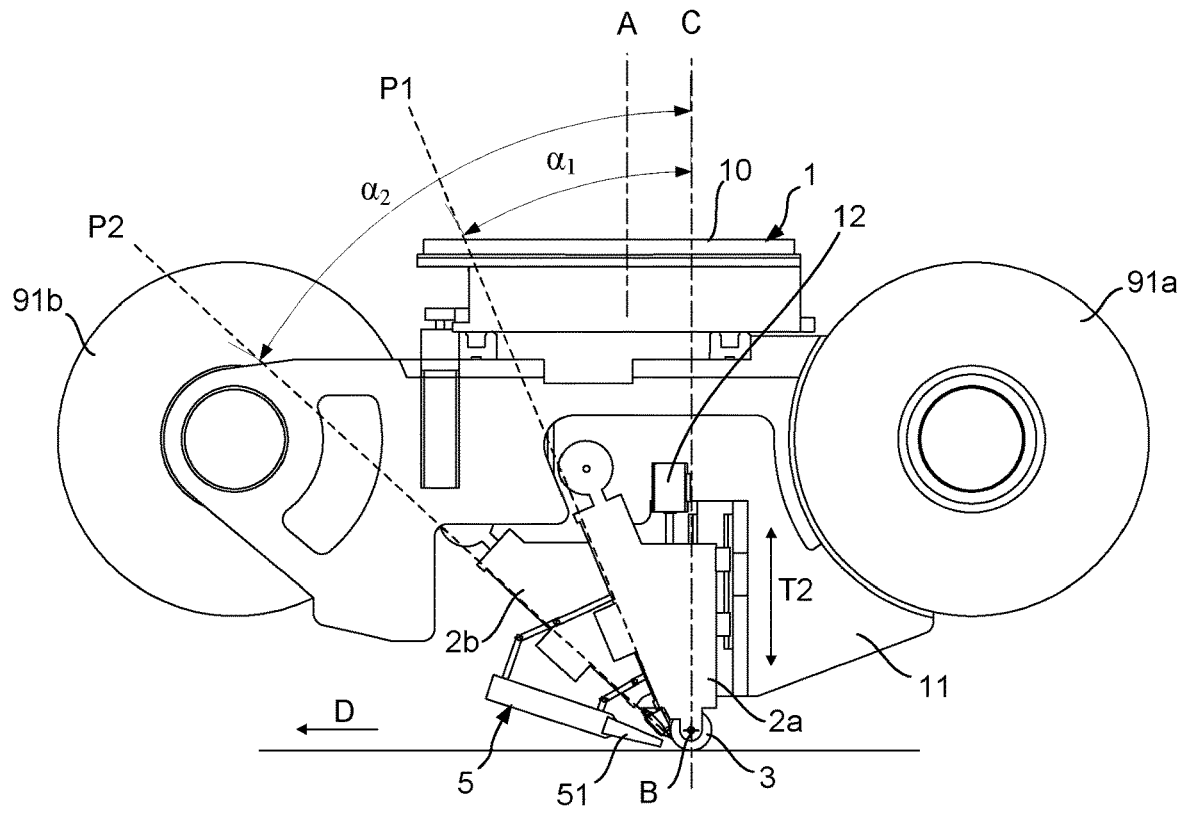
FIG. 1 is a schematic side view of a fiber application head according to an embodiment of the invention.

FIG. 1 illustrates a fiber application head 1 according to the invention for the lay-up of a plurality of continuous fibers arranged edge-to-edge in the form of a band. In the present embodiment, the head comprises one independent compaction roller per fiber. The head 1 is intended to be assembled to a displacement system to perform the fiber lay-up operations, the fibers being in the present embodiment packaged in the form of cassettes, and the cassettes are carried on the head. The head comprises a support structure or frame 10 provided with assembly means (not shown) for assembling the head, according to an assembly axis A, to a head displacement system, for example the wrist of a poly-articulated robot or a gantry-type Cartesian displacement system.

The head carries a plurality of functional modules 2a, 2b arranged side by side. Each functional module is associated with a fiber cassette 91a, 91b and comprises cutting means, rerouting means, clamping means and a compaction roller 3.

The head comprises two types of functional module, first functional modules 2a, also called downstream functional modules, associated with downstream fiber cassettes 91a, arranged downstream of the functional modules with respect to the advance direction D of the head during lay-up, and second functional modules 2b, also called upstream functional modules, associated with upstream fiber cassettes 91b, arranged upstream of the functional modules with respect to the advance direction D. The functional modules are arranged in a row, the row comprising alternating downstream functional modules 2a and upstream functional modules 2b.

The functional modules are mounted on the frame by means of support elements 11, each support element carrying a downstream functional module 2a and an upstream functional module 2b. Each functional module is mounted independently on the support element, mobile in translation in a compaction direction T2, which is parallel to the assembly axis A, and is connected at the top to the end of the rod of a compaction cylinder 12, the cylinder being connected by its body to the support element.

The compaction roller 3 is mounted between two flanges of the functional module, mobile in rotation around a rotation axis B, which is perpendicular to the direction T2. During the translational displacement of a functional module in the direction T2, the rotation axis B of its compaction roller moves in a plane C, called the compaction plane, which is parallel to the direction T2. The support elements are mounted on the frame in such a way that the rotation axis of the rollers are all arranged substantially in the same plane C.

Each downstream functional module comprises means for guiding a fiber allowing to guide the fiber entering the module towards the compaction roller along a plane P1, the plane forming an angle $\alpha1$ with the plane C. Each upstream functional module comprises means for guiding a fiber allowing to guide the fiber entering the module towards the compaction roller along to a plane P2, the planes P1 and P2 being arranged on the same side of the plane C, the plane P2 forming an angle $\alpha2$ with the plane C which is greater than the angle $\alpha1$. The planes P1 and P2 are arranged upstream of the plane C with respect to the advance direction of the head during lay-up, the plane P2 being arranged upstream of the plane P1.

Each functional module comprises cutting means for cutting the fiber, rerouting means for rerouting the fiber to the compaction roller after a cutting operation, and clamping means for clamping the fiber just cut, such means being known per se. As an example, the downstream functional module comprises cutting means and clamping means, as described in patent document EP2134532, WO2017/072421 or FR17/01245 and FR17/01247.

Figure 2:
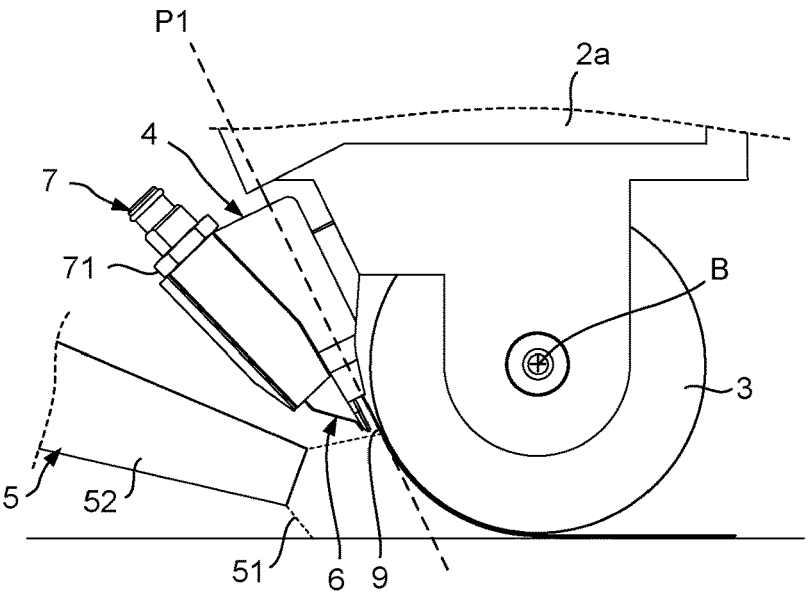
FIG. 2 is an enlarged partial view of FIG. 1 illustrating the retractable flap and its actuation system in the vicinity of the compaction roller, the flap being in retracted position.
Figure 3:
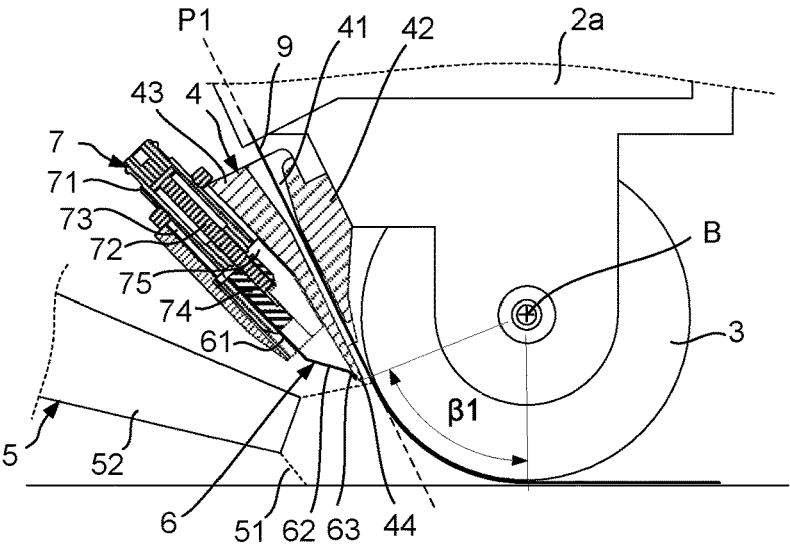
FIG. 3 is a view similar to that of FIG. 2 with a partial sectional view at the level of the flap actuation system.
Figure 4:
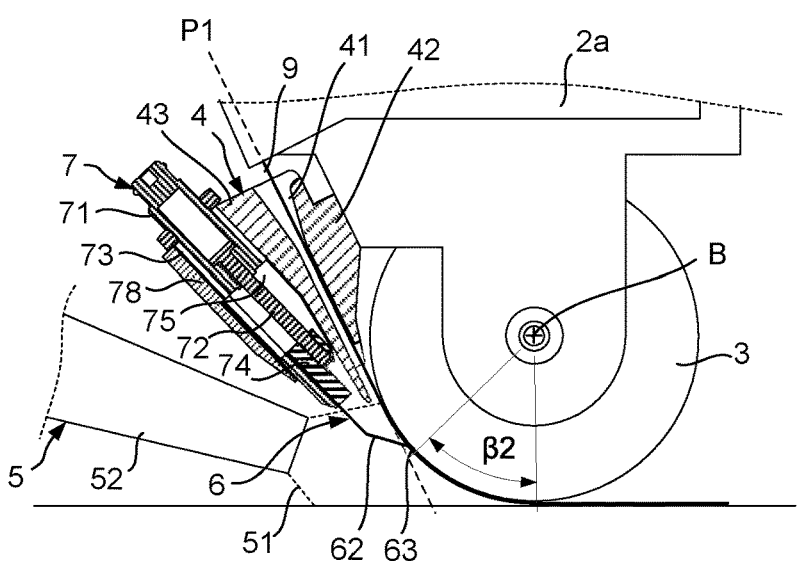
FIG. 4 is a view similar to that of FIG. 3 with the retractable flap in active position.

The guiding means allow to guide the fiber 9 between the clamping means, the rerouting means and the cutting means, and towards the compaction roller. To guide the fiber from the clamping means to the cutting means, the guiding means comprise a first guiding system (not shown) comprising for example a channel, formed at the assembly interface of two plates. In order to guide the fiber between the cutting means and the roller, the guiding means comprise for example, as illustrated in FIGS. 2 to 4, a second guiding system 4 comprising a channel 41 formed at the assembly interface of two plates, including a first inner plate 42 and a second outer plate 43. This second guiding system is for example mounted on the mounting clevis of the compaction roller, by its inner plate 42.

The compaction rollers are all identical and are preferably able to conform to the application surface, especially to convex and/or concave application surfaces. Each compaction roller is preferably a compaction roller made of a flexible material, which is elastically deformable, such as an elastomer. The roller comprises a cylinder made of flexible material, which is mounted in a rotationally fixed manner on a rigid axle, for example metallic, by means of which the roller is mounted in a rotationally free manner between two flanges.

Each compaction cylinder 12 is able to displace its associated functional module between an extreme high position and an extreme low position. For the lay-up of a fiber with a functional module, the module is elastically urged towards its extreme low position by its compaction cylinder. The head is brought into contact with the lay-up surface, the roller in contact with the lay-up surface. The compaction force for the lay-up can be regulated by adjusting the air supply pressure in the upper chamber of the cylinder. During lay-up, the functional module can move between its extreme low position and its extreme high position to conform to the lay-up surface. When the module is not being used to lay-up a fiber, the module is held in the extreme high position by supplying compressed air to the lower chamber. For the sake of simplicity, the compaction roller is illustrated with a cylindrical shape in FIGS. 2 to 4. In practice, the compaction roller made of a flexible material is deformed by the compaction force and has a crushed shape.

The head comprises a heating system 5, associated with each functional module, whose radiation 51 is directed obliquely towards the nip zone or contact zone between the compaction roller and the application surface, to heat the fiber to be laid up, prior to its compaction by the latter, as well as the application surface and/or one or more previously applied fiber to heat the application surface upstream of the roller. In the present embodiment, each module carries a heating system 5, upstream of the roller with respect to the advance direction of the head. Each heating system comprises, for example, a flash lamp, as described in patent document WO2014/029969 or WO2017/134453, comprising an optic formed by a quartz 52 to guide the radiation. The lamp is mounted so that the main radiation from the lamp is directed towards the nip zone between the roller and the application surface.

Figure 5:
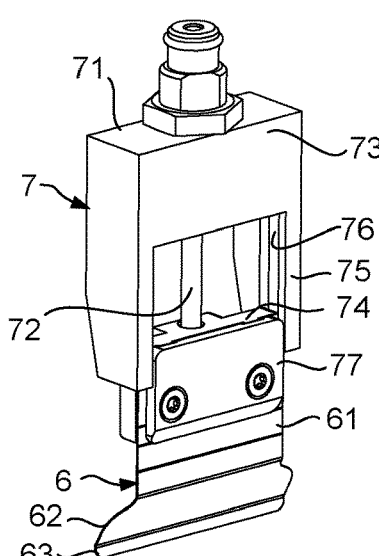
FIG. 5 is a perspective view of the retractable flap and its actuation system, without the protective cover.

According to embodiments of the invention, the downstream functional modules are each equipped with a retractable flap 6 that is able to be displaced by an actuation system 7 between two positions. With reference to FIGS. 3 to 5, the flap is formed by a flexible metal plate mounted at the end of the rod 72 of a cylinder 71 of the actuation system 7. The cylinder is mounted by its body 73 on the second guiding system 4, in particular on its second outer plate 43. For mounting the flap, the rod is equipped at its end with a slide 74 whose side edges are able to slide in two grooves 76 of two guiding plates 75 extending from the body 73 of the cylinder parallelly to the rod. The flap is mounted by its proximal part 71 flat on the slide by means of a counter-plate 77. The proximal part is placed between the slide and the counter-plate, and is fixed by means of screws, passing through holes in the counter-plate and holes in the proximal part, and screwed into tapped holes in the slide. A protective cover 78 is mounted on the body to cover the rod.

The flap 6 comprises a flat proximal part 61 extended by a flat distal part 62 inclined towards the roller, forming for example an angle of 10 to 35° with respect to the proximal part, this distal part ending in a curved distal end 63 by which the flap is able to come into contact, flat, against the roller.

The cylinder 71 is able to be controlled to displace the flap in translation between a retracted position and an active position. The cylinder is, for example, a single-acting pneumatic cylinder, which is supplied with compressed air to displace the flap to the active position, a spring (not shown) ensuring the return to the retracted position.

In its retracted position, the flap is spaced apart from the compaction roller, its distal end 63 is set back or at the level of the distal end 44 of the second guiding system, against the outer surface of the outer plate, as shown in FIG. 3. In its active position, the flap is in contact against the outer surface of the roller with its distal end. Preferably, the flap comes in abutment substantially tangentially and elastically by its distal end against the surface of the roller. The flap has, at least at its distal end, a width substantially equal to the width of the roller. In the retracted position, the surface of the roller receiving the radiation extends from the guiding system, more precisely from the distal end 44 of the outer plate, to the nip zone between the roller and the lay-up surface, this roller surface corresponding to the angle β1 in FIG. 3.

In the active position, the surface area of the roller receiving the radiation is reduced, this one extending from the distal end of the flap to the nip zone. This surface area of the roller corresponds to the angle β2 in FIG. 4, which is smaller than the aforementioned angle β1. As previously indicated, in practice the roller has a crushed, non-cylindrical shape, the angles β1 and β2 are in practice smaller than those illustrated.

Advantageously, the flap is brought into an active position during the fiber rerouting, to press the fiber against the roller. The downstream functional modules have a guiding plane P1 with a small angle α1, and as a result, are more sensitive to fiber rerouting issues. In the absence of flap, the fiber exiting the guiding system tends to follow the guiding plane P1 and to hit the lay-up surface before passing under the roller. According to an embodiment, only the downstream modules are each equipped with a retractable flap. During their re-routing, the flap allows the fiber to be oriented against the roller towards the nip zone, so that the end of the fiber is nipped and compacted by the roller. As soon as the end of the fiber is no longer compacted by the compaction roller, the flap can be returned to its retracted position, so that the fiber exiting the guiding system is more heated by the radiation, and thus the lay-up can be performed at high speeds. The cylinder 71 can be controlled by its own pneumatic valve system. For the sake of space, the cylinder may be controlled by the same valve system used for the fiber re-routing means.

When a fiber is cut by the cutting means of the functional module, the end of the cut fiber exiting the guiding system may tend to come against the heating system, in particular the waveguide formed by the quartz 52, especially in the case of fibers having a certain rigidity, which may lead to a clogging of the quartz and thus a deterioration of the heating quality. Advantageously, the flap is brought to the active position when a fiber is cut, so that the end of the fiber is pressed by the flap against the roller.

According to an embodiment, the downstream and upstream modules are each equipped with a retractable flap as described above.

According to other embodiments, the aforementioned flash lamp heating system is replaced with a laser type heating system.

The fibers are preferably flat continuous fibers, such as tows, pre-impregnated with a thermosetting resin or a thermoplastic resin, or dry fibers provided with a binder. The binder is in the form of powder and/or one or more veils, preferably of the thermoplastic type.

The head can be adapted for lay-up of fibers of various widths, but is particularly advantageous for lay-up of fibers of at least one-half inch wide, for example one inch, one and one-half inches, or two inches. For widths up to one-half inch, the fibers can be wound into helical winding spools. For widths greater than one-half inch, the fiber is wound into a spool or cassette without traverse winding.

According to another embodiment, the retractable flap according to the invention is mounted on a head comprising a single compaction roller and equipped with a guiding system for guiding a plurality of fibers towards the roller in the form of a band of fibers in which the fibers are arranged edge to edge. In this case, the head comprises a flap advantageously having a plurality of flexible tabs, as described in the aforementioned patent WO2013/030467, each tab being able to press on the face of a fiber opposite the roller in order to press the fiber against the roller.

Although the invention has been described in connection with a particular embodiment, it is clear that it is by no means limited thereto and that it includes all the technical equivalents of the means described as well as their combinations if these fall within the scope of the invention.

The invention claimed is:

1. A fiber application head for the production of composite material parts comprising:

a compaction system comprising at least one compaction roller;

guiding means for guiding at least one fiber towards said compaction roller;

at least one retractable flap displaceable by actuation means between an active position in which said at least one retractable flap is able to come by its distal end against the fiber exiting from the guiding means in order to bring said fiber in abutment against the compaction roller, and a retracted position in which said at least one retractable flap is spaced apart from the compaction roller; and at least one heating system able to emit thermal radiation towards a nip zone between the compaction roller and an application surface, in order to heat the fiber exiting from the guiding means, as well as the application surface and/or one or more fibers previously applied, said at least one retractable flap being displaceable by actuation means between its active position and its retracted position so that the compaction roller is subjected to the radiation of the at least one heating system over a greater surface area in the retracted position than in the active position of the at least one retractable flap, wherein, in the retracted position, a surface of the compaction roller is exposed to the radiation emitted by the heating system over a first angle, and, in the active position, a surface area of the compaction roller receiving the radiation extends from the distal end of the retractable flap to the nip zone over a second angle that is smaller than the first angle.

2. The fiber application head according to claim 1, wherein the at least one retractable flap is displaceable by a translational movement between its active position and its retracted position, said actuation means comprising at least one cylinder.

3. The fiber application head according to claim 1, wherein the at least one retractable flap in its active position is elastically in abutment with its distal end against the compaction roller.

4. The fiber application head according to claim 1, wherein said guiding means are able to guide a plurality of fibers onto the compaction roller in the form of a band, the at least one retractable flap being associated with the compaction roller.

5. The fiber application head according to claim 1, wherein said fiber application head is able to apply several fibers by means of the compaction system comprising several independent compaction rollers and compaction cylinders, wherein, for each fiber, the head comprises a functional module configured to cut and reroute said fiber, each functional module being mounted so as to be mobile in translation in a compaction direction on a support element of the head, each compaction roller being mounted on one or more adjacent functional modules and a compaction cylinder being associated with the functional module(s) associated with a compaction roller, each of the at least one heating system being associated with one of the several independent compaction rollers, and each of the at least one retractable flap being associated with at least one of the several independent compaction rollers.

6. The fiber application head according to claim 5, comprising one compaction roller per functional module.

7. The fiber application head according to claim 5, comprising at least one first functional module and at least one second functional module arranged alternately side by side, each first functional module comprising a first channel configured to guide a first fiber towards the compaction roller along a first guiding plane forming a first non-zero angle with the compaction plane of the rotation axis of the compaction rollers, each second functional module comprising a second channel configured to guide a second fiber towards the compaction roller along a second guiding plane forming a second non-zero angle with the compaction plane, said second non-zero angle being greater than the first non-zero angle, said first and second guiding planes being arranged on the same side of the compaction plane.

8. The fiber application head according to claim 6, comprising at least one first functional module and at least one second functional module arranged alternately side by side, each first functional module comprising a first channel configured to guide a first fiber towards the compaction roller along a first guiding plane forming a first non-zero angle with the compaction plane of the rotation axis of the compaction rollers, each second functional module comprising a second channel configured to guide a second fiber towards the compaction roller along a second guiding plane forming a second non-zero angle with the compaction plane, said second non-zero angle being greater than the first non-zero angle, said first and second guiding planes being arranged on the same side of the compaction plane, wherein said at least one retractable flap is associated with said at least one first functional module.

9. The fiber application head according to claim 1, wherein the at least one heating system comprises a laser type heating system, or a flash lamp type heating system.

10. A method for manufacturing a composite material part comprising the application of continuous fibers onto an application surface, wherein the application of fibers is performed by means of a fiber application head according to claim 1, by relative displacement of the application head with respect to the lay-up surface according to deposition trajectories, the at least one retractable flap associated with a fiber being displaced into the active position at least during a fiber rerouting operation and/or fiber cutting operation, and returned to the retracted position when the end of the rerouted fiber is no longer compacted by the compaction roller, so as to heat said fiber before it is compacted by the compaction roller over a greater length of fiber.

11. The fiber application head according to claim 1, wherein the at least one retractable flap is movable relative to the guiding means.

12. The fiber application head according to claim 1, wherein the at least one retractable flap is movable in translation relative to the guiding means.

13. The fiber application head according to claim 11, wherein the actuation means is mounted to the guiding means.

14. The fiber application head according to claim 11, wherein, in the active position, a distal end of the at least one retractable flap is positioned at a first position in which the distal end of the at least one retractable flap is in contact with the fiber and the at least one retractable flap presses the fiber against the compaction roller, and wherein, in the retracted position, the distal end of the at least one retractable flap is set back relative to the first position.

15. The fiber application head according to claim 14, wherein the guiding means comprise a channel in which said fiber is guided, said channel having an end located adjacent the compaction roller, and wherein, in the active position, the distal end of the at least one retractable flap is positioned farther away from the end of the channel than in the retracted position.

16. The fiber application head according to claim 11, wherein the actuation system is configured to move the at least one retractable flap in translation between said retracted position and said active position.

17. The fiber application head according to claim 11, wherein the at least one retractable flap comprises a metal plate including a proximal part coupled to the actuation means and a distal part inclined relative to the proximal part in a direction of the compaction roller.

18. The fiber application head according to claim 17, wherein the distal part forms an angle relative to the proximal part of 10 to 35 degrees.

19. The fiber application head according to claim 11, wherein the actuation means is configured to position the at least one retractable flap in the active position during rerouting or cutting of the fiber and wherein the actuation means is configured to position the at least one retractable flap in the retracted position after rerouting or cutting of the fiber.

\* \* \* \* \*